(12) United States Patent
Lomsak

(10) Patent No.: US 8,882,117 B1
(45) Date of Patent: Nov. 11, 2014

(54) LUBRICATION SYSTEM AND METHOD

(76) Inventor: Michael J. Lomsak, Plant City, FL (US)

(*) Notice: Subject to any disclaimer, the term of this patent is extended or adjusted under 35 U.S.C. 154(b) by 446 days.

(21) Appl. No.: 13/429,024

(22) Filed: Mar. 23, 2012

(51) Int. Cl.
*B62D 7/18* (2006.01)

(52) U.S. Cl.
USPC .................... 280/93.512; 301/131; 464/7

(58) Field of Classification Search
USPC ............. 280/93.512; 301/124.1, 131, 132; 464/7; 384/13, 286, 313, 322, 462, 384/467, 474
See application file for complete search history.

(56) References Cited

U.S. PATENT DOCUMENTS

| | | | | |
|---|---|---|---|---|
| 4,784,500 A * | 11/1988 | Prokop | ........................ | 384/462 |
| 5,174,839 A * | 12/1992 | Schultz et al. | ................ | 152/415 |
| 5,685,053 A * | 11/1997 | Deonarine et al. | ........... | 29/426.4 |
| 5,685,681 A * | 11/1997 | Smith, II | ........................ | 411/395 |
| 2010/0225157 A1* | 9/2010 | Kirby | ............................ | 301/131 |

* cited by examiner

*Primary Examiner* — Ruth Ilan

(57) ABSTRACT

A spindle has first, second and third portions, each portion having interior and exterior surfaces, the third portion having an interiorly facing interior spindle face. A cylindrical sleeve bearing has an exterior surface in the first portion and an interior surface rotatably receiving an axle. A knuckle has an exteriorly facing exterior knuckle face positioned in contact with the interior spindle face. The knuckle has an interior knuckle face and an aperture for the passage of the axle. A lubrication assembly is formed of a channel extending through the knuckle and the spindle and the bearing sleeve and includes a lubrication fitting. The invention also includes a lubrication method.

11 Claims, 4 Drawing Sheets

US 8,882,117 B1

LUBRICATION SYSTEM AND METHOD

BACKGROUND OF THE INVENTION

1. Field of the Invention

The present invention relates to a lubrication system and method and more particularly pertains to lubricating front wheel drive axles of heavy trucks and equipment in a safe, time saving, convenient and economical manner.

2. Description of the Prior Art

The use of lubrication systems ad methods of known designs and configurations is known in the prior art. More specifically, lubrication systems and methods of known designs and configurations previously devised and utilized for the purpose of lubricating axles are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, they do not describe a lubrication system or method for lubricating front wheel drive axles of heavy trucks and equipment adapted to facilitate lubricating in a safe, time saving, convenient and economical manner.

In this respect, the lubrication system and method according to the present invention substantially depart from the conventional concepts and designs of the prior art, and in doing so provides an apparatus primarily developed for lubricating front wheel drive axles of heavy trucks and equipment which is adapted to facilitate lubricating in a safe, time saving, convenient and economical manner.

Therefore, it can be appreciated that there exists a continuing need for a new and improved lubrication system which can be used for lubricating front wheel drive axles of heavy trucks and equipment which is adapted to facilitate lubricating in a safe, time saving, convenient and economical manner. In this regard, the present invention substantially fulfills this need.

SUMMARY OF THE INVENTION

In view of the disadvantages inherent in the known types of lubrication systems and methods of known designs and configurations now present in the prior art, the present invention provides an improved lubrication system and method. As such, the general purpose of the present invention, which will be described subsequently in greater detail, is to provide a new and improved lubrication system and method which has all the advantages of the prior art and none of the disadvantages.

To attain this, the present invention essentially comprises a spindle having first, second and third portions, each portion having interior and exterior surfaces, the third portion having an interiorly facing interior spindle face. A cylindrical sleeve bearing has an exterior surface in the first portion and an interior surface rotatably receiving an axle. A knuckle has an exteriorly facing exterior knuckle face positioned in contact with the interior spindle face. The knuckle has an interior knuckle face and an aperture for the passage of the axle. A lubrication assembly is formed of a channel extending through the knuckle and the spindle and the bearing sleeve and includes a lubrication fitting.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lubrication system ad method which has all of the advantages of the prior art lubrication systems and methods of known designs and configurations and none of the disadvantages.

It is another object of the present invention to provide a new and improved lubrication system and method which may be easily and efficiently manufactured and marketed.

It is further object of the present invention to provide a new and improved lubrication system and method which is of durable and reliable constructions.

An even further object of the present invention is to provide a new and improved lubrication system and method which is susceptible of a low cost of manufacture with regard to both materials and labor, and which accordingly is then susceptible of low prices of sale to the consuming public, thereby making such lubrication system economically available to the buying public.

Even still another object of the present invention is to provide a lubrication system and method for lubricating front wheel drive axles of heavy trucks and equipment which is adapted to facilitate lubricating in a safe, time saving, convenient and economical manner.

Lastly, it is an object of the present invention to provide a new and improved front wheel drive axle lubrication system and method for lubricating front wheel drive axles of heavy trucks and equipment comprised of a plurality of components and steps, in their broadest context including a spindle, a cylindrical sleeve, a knuckle, and a lubrication assembly, which is adapted to facilitate lubricating in a safe, time saving, convenient and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred primary and alternate embodiments, systems and methods, of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures illustrating the primary embodiment and alternate embodiments, systems and methods, of the present invention.

DESCRIPTION OF THE PREFERRED EMBODIMENT

Figure 1:
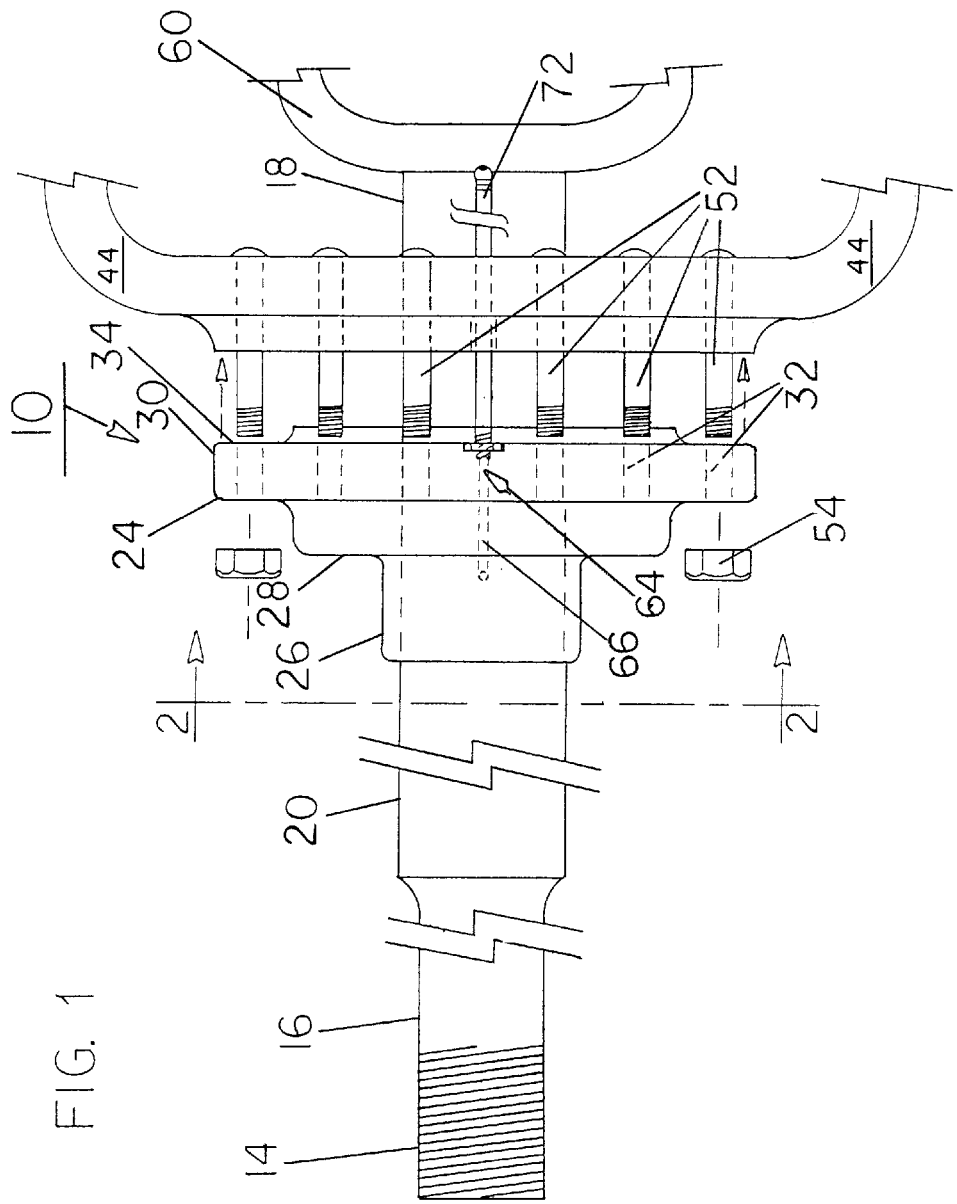
FIG. 1 is a side elevational view, partially exploded, of a front wheel drive axle lubrication system constructed in accordance with the principles of the present invention.
Figure 3:
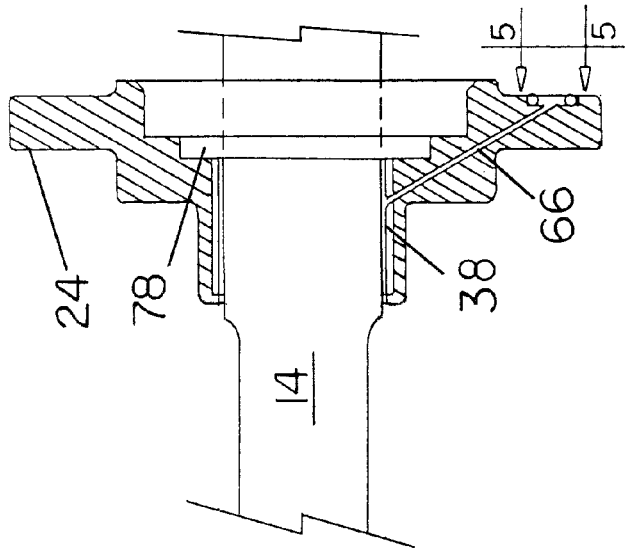
FIGS. 3 and 4 are cross sectional views take along lines 3-3 and 4-4 of FIG. 2, FIG. 4 being with the axle removed.
Figure 2:
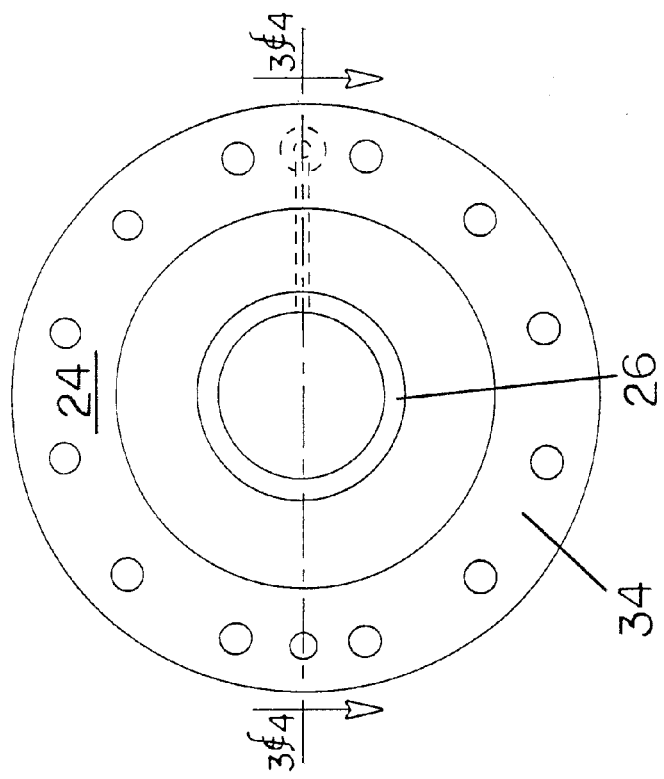
FIG. 2 is a front view taken along line 2-2 of FIG. 1, showing the interior face of the spindle.
Figure 5:
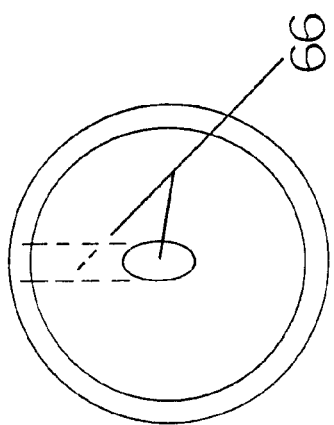
FIG. 5 is a front view of the input end of the grease channel.
Figure 6:
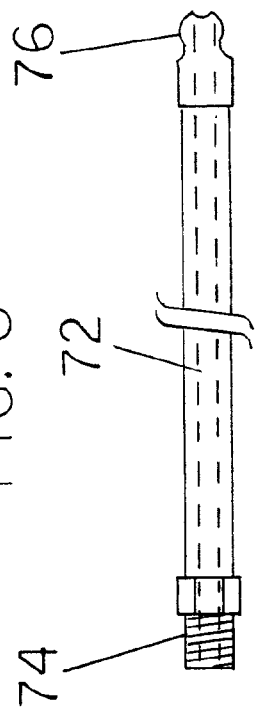
FIG. 6 is a front elevational view of a grease fitting.
Figure 4:
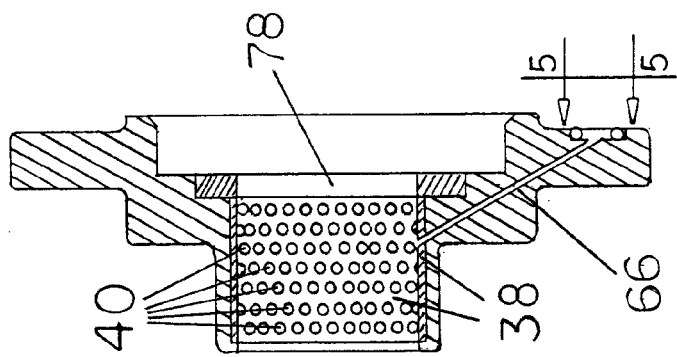
Figure 8:
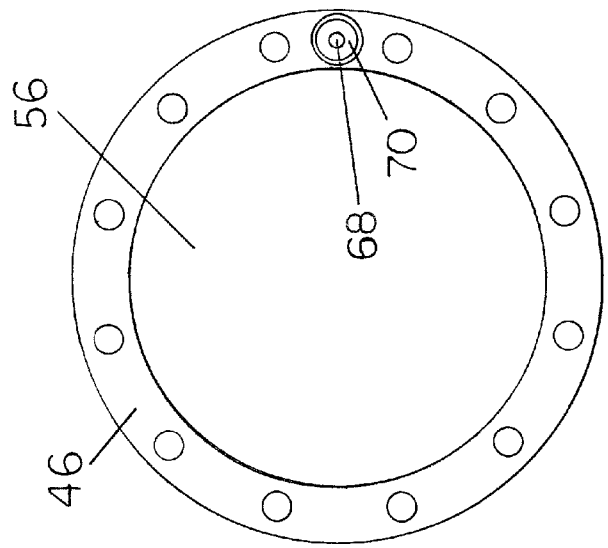
FIG. 8 is a front view taken along line 2-2 of FIG. 1, showing the interior face of the spindle.

With reference now to the drawings, and in particular to FIG. 1 thereof, the preferred embodiment of the new and improved lubrication system embodying the principles and concepts of the present invention and generally designated by the reference numeral 10 will be described.

The present invention, the lubrication system 10 is comprised of a plurality of components. Such components in their broadest context include a spindle, a cylindrical sleeve, a knuckle, and a lubrication assembly.

The front wheel drive axle lubrication system 10 of the present invention is for heavy trucks and equipment. The system is adapted to facilitate lubricating in a safe, time saving, convenient and economical manner. First provided is a cylindrical axle 14 having a central axis. The axle has an exterior section 16, an interior section 18, and an intermediate section 20 between the exterior and interior sections. The interior and intermediate sections have a diameter greater than the diameter of the exterior section. A tire is mounted on the exterior section of the axle.

Next provided is a spindle 24. The spindle has a cylindrical first portion 26 with an interior first diameter and an exterior second diameter. The spindle also has a cylindrical second portion 28 with an interior third diameter greater than the first diameter and an exterior fourth diameter greater than the second diameter. The spindle also has a cylindrical third portion 30 with an interior fifth diameter greater than the third diameter and an exterior sixth diameter greater than the fourth diameter. The spindle has an axis co-extensive with the central axis. The third portion of the spindle has axial spindle bolt holes 32 equally spaced from the central axis. The third portion of the spindle provides an interiorly facing annular interior spindle face 34.

A cylindrical sleeve bearing 38 is next provided. The sleeve bearing has an axis co-extensive with the central axis. The sleeve bearing has an exterior surface press fit into the interior surface of the first portion of the spindle. The sleeve bearing has an interior surface rotatably receiving the intermediate section of the axle. A cylindrical grease-receiving space is formed between the interior surface of the sleeve bearing and the intermediate section of the axle. The interior surface of the cylindrical sleeve is formed with circular recesses 40 for receiving lubricating grease. The circular recesses are formed as generally hemispherical dimples.

Next, a cylindrical knuckle 44 is provided. The knuckle has an exteriorly facing annular exterior knuckle face 46 positioned in contact with the interiorly facing interior spindle face. The knuckle also has an interiorly facing interior knuckle face 48. The annular knuckle face has axial knuckle bolt holes 50 in axial alignment with the axial spindle bolt holes. Bolts 52 extend through the spindle bolt holes and knuckle bolt holes with an associated nut 54 on each bolt for coupling the knuckle to the spindle. The knuckle has a knuckle aperture 56 for the passage of the axle. The knuckle aperture has an axis co-extensive with the central axis.

A universal joint 60 is next provided. The universal joint is operatively coupled to the interior section of the axle interiorly of the knuckle. The universal joint is adapted to rotate the axle and the tire mounted thereon.

Lastly, a greasing assembly 64 is provided. The greasing assembly is formed of a linear first channel 66 extending between the interior surface of the spindle and the interior surface of the sleeve bearing and passing through the third portion and second portion and first portion of the spindle. The greasing assembly is also formed of a linear second channel 68 extending between the interior surface of the knuckle and the exterior surface of the knuckle and passing through the knuckle. The first channel and the second channel are formed in axial alignment at an angle of 63 degrees from the central axis, plus or minus 10 percent. The greasing assembly includes an annular knuckle recess 70 in the interior face of the knuckle in axial alignment with the first and second channels. An elastomeric O-ring is provided in the knuckle recess. The greasing assembly also includes a grease fitting 72. The grease fitting has a first end 74 threadedly coupled to the interior surface of the knuckle operatively coupled to the second grease channel. The grease fitting also has a second end 76 adapted to couple to a source of grease. A seal 78 is provided in the second portion of the spindle. The seal has an annular configuration to abate grease passage interiorly of the sleeve bearing. The seal has a steel outer layer, a brass intermediate layer and a nylon inner layer.

Figure 7:
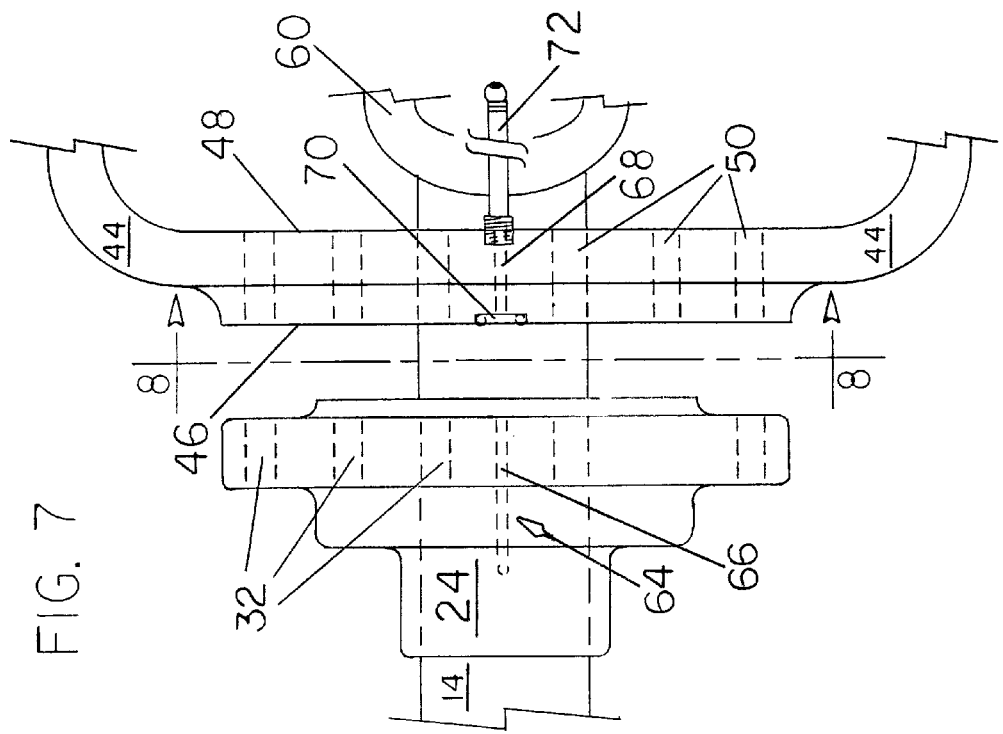
FIG. 7 is a side elevational view similar to FIG. 1 but showing an alternate embodiment of the invention.

The grease fitting is adapted to couple to the knuckle, FIG. 7, or to the spindle, FIG. 1. The O-ring is in the knuckle recess or in the spindle recess. The coupling may, however, be employed without the O-ring.

In addition to the system as described above, the present invention also includes the method of lubricating with the system as described above. The method includes the step of first providing a lubrication system comprising (1) a spindle having first, second and third portions, each portion having interior and exterior surfaces, one of the third portion having an interiorly facing interior spindle face; (2) a cylindrical sleeve bearing having an exterior surface in the first portion, the sleeve bearing having an interior surface rotatably receiving an axle; and (3) a knuckle having an exteriorly facing exterior knuckle face positioned in contact with the interior spindle face, the knuckle having an interior knuckle face, the knuckle having an aperture for the passage of the axle. The next step is drilling a channel through the knuckle and the spindle and the bearing sleeve. The final step is providing a fitting and coupling the lubrication fitting. In one embodiment the fitting is coupled to the spindle. In another embodiment the fitting is coupled to the knuckle.

It should be understood that the present invention, the system as well as the method, are readily adapted for use in the retrofit market to improve existing equipment. In addition, the present invention, the system as well as the method, are also readily adapted for use in newly manufactured equipment.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lubrication system comprising:
    a spindle having first, second and third portions, each portion having interior and exterior surfaces, the third portion having an interiorly facing interior spindle face;
    a cylindrical sleeve bearing having an exterior surface in the first portion, the sleeve bearing having an interior surface rotatably receiving an axle;
    a knuckle having an exteriorly facing exterior knuckle face positioned in contact with the interior spindle face, the knuckle having an interior knuckle face, the knuckle having an aperture for the passage of the axle; and
    a lubrication assembly formed of a channel extending through the knuckle and the spindle and the bearing sleeve, the lubrication assembly also including a lubrication fitting.

2. The system as set forth in claim 1 wherein the fitting has a length of between 0.25 inches and 2.0 inches.

3. The system as set forth in claim 1 wherein the lubrication fitting has an interior end threadedly coupled to the knuckle.

4. The system as set forth in claim 1 wherein the lubrication fitting has an interior end threadedly coupled to the spindle.

5. The system as set forth in claim 1 wherein the lubrication fitting has an interior end threadedly coupled to the spindle with an O-ring around the interior end.

6. The system as set forth in claim 1 wherein the interior surface of the sleeve bearing has lubrication receiving regions chosen from the class of lubrication receiving regions including dimples, holes, holey combing, and flutes.

7. The system as set forth in claim 1 wherein the spindle and the knuckle are coupled by fasteners chosen from the class of fasteners including bolts and studs.

8. A front wheel drive axle lubrication system (10) for heavy trucks and equipment, the system adapted to facilitate lubricating, the system comprising, in combination:
    a cylindrical axle (14) having a central axis, the axle having an exterior section (16) and an interior section (18) and an intermediate section (20) between the exterior and interior sections, the interior and intermediate sections having a diameter greater than the diameter of the exterior section, a tire mounted on the exterior section of the axle;
    a spindle (24) having a cylindrical first portion (26) with an interior first diameter and an exterior second diameter, the spindle having a cylindrical second portion (28) with an interior third diameter greater than the first diameter and an exterior fourth diameter greater than the second diameter, the spindle having a cylindrical third portion (30) with an interior fifth diameter greater than the third diameter and an exterior sixth diameter greater than the fourth diameter, the spindle having an axis co-extensive with the central axis, the third portion of the spindle having axial spindle bolt holes (32) equally spaced from the central axis, the third portion of the spindle providing an interiorly facing annular interior spindle face (34);
    a cylindrical sleeve bearing (38) having an axis co-extensive with the central axis, the sleeve bearing having an exterior surface press fit into the interior surface of the first portion of the spindle, the sleeve bearing having an interior surface rotatably receiving the intermediate section of the axle, a cylindrical grease-receiving space formed between the interior surface of the sleeve bearing and the intermediate section of the axle, the interior surface of the cylindrical sleeve being formed with circular recesses (40) for receiving lubricating grease, the circular recesses being formed as generally hemispherical dimples;
    a cylindrical knuckle (44) having an exteriorly facing annular exterior knuckle face (46) positioned in contact with the interiorly facing interior spindle face, the knuckle having an interiorly facing interior knuckle face (48), the annular exterior knuckle face having axial knuckle bolt holes (50) in axial alignment with the axial spindle bolt holes (32), bolts (52) extending through the spindle bolt holes and knuckle bolt holes with an associated nut (54) on each bolt for coupling the knuckle to the spindle, the knuckle having a knuckle aperture (56) for the passage of the axle, the knuckle aperture having an axis co-extensive with the central axis;
    a universal joint (60) operatively coupled to the interior section of the axle interiorly of the knuckle, the universal joint adapted to rotate the axle and the tire mounted thereon; and
    a greasing assembly (64) formed of a linear first channel (66) extending between the interior surface of the spindle and the interior surface of the sleeve bearing and passing through the third portion and second portion and first portion of the spindle, the greasing assembly also formed of a linear second channel (68) extending between the interior surface of the knuckle and the exterior surface of the knuckle and passing through the knuckle, the first channel and the second channel being formed in axial alignment at an angle of 63 degrees from the central axis, plus or minus 10 percent, the greasing assembly including an annular knuckle recess (70) in the interior face of the knuckle in axial alignment with the first and second channels, an elastomeric O-ring in the knuckle recess, the greasing assembly also including a grease fitting (72) having a first end (74) threadedly coupled to the interior surface of the knuckle operatively coupled to the second grease channel, the grease fitting also having a second end (76) adapted to couple to a source of grease, a seal (78) in the second portion of the spindle, the seal having an annular configuration to abate grease passage interiorly of the sleeve bearing, the seal having a steel outer layer, a brass intermediate layer and a nylon inner layer.

9. A lubrication method comprising the steps of:
providing a lubrication system comprising a spindle having first, second and third portions, each portion having interior and exterior surfaces, one of the portions having an interiorly facing interior spindle face; a cylindrical sleeve bearing having an exterior surface in the first portion, the sleeve bearing having an interior surface rotatably receiving an axle; and a knuckle having an exteriorly facing exterior knuckle face positioned in contact with the interior spindle face, the knuckle having an interior knuckle face, the knuckle having an aperture for the passage of the axle;

drilling a channel through the knuckle and the spindle and the bearing sleeve;

providing a lubrication fitting; and coupling the lubrication fitting.

10. The method as set forth in claim 9 wherein the lubrication fitting is coupled to the spindle.

11. The method as set forth in claim 9 wherein the lubrication fitting is coupled to the knuckle.

\* \* \* \* \*